Figure 1:
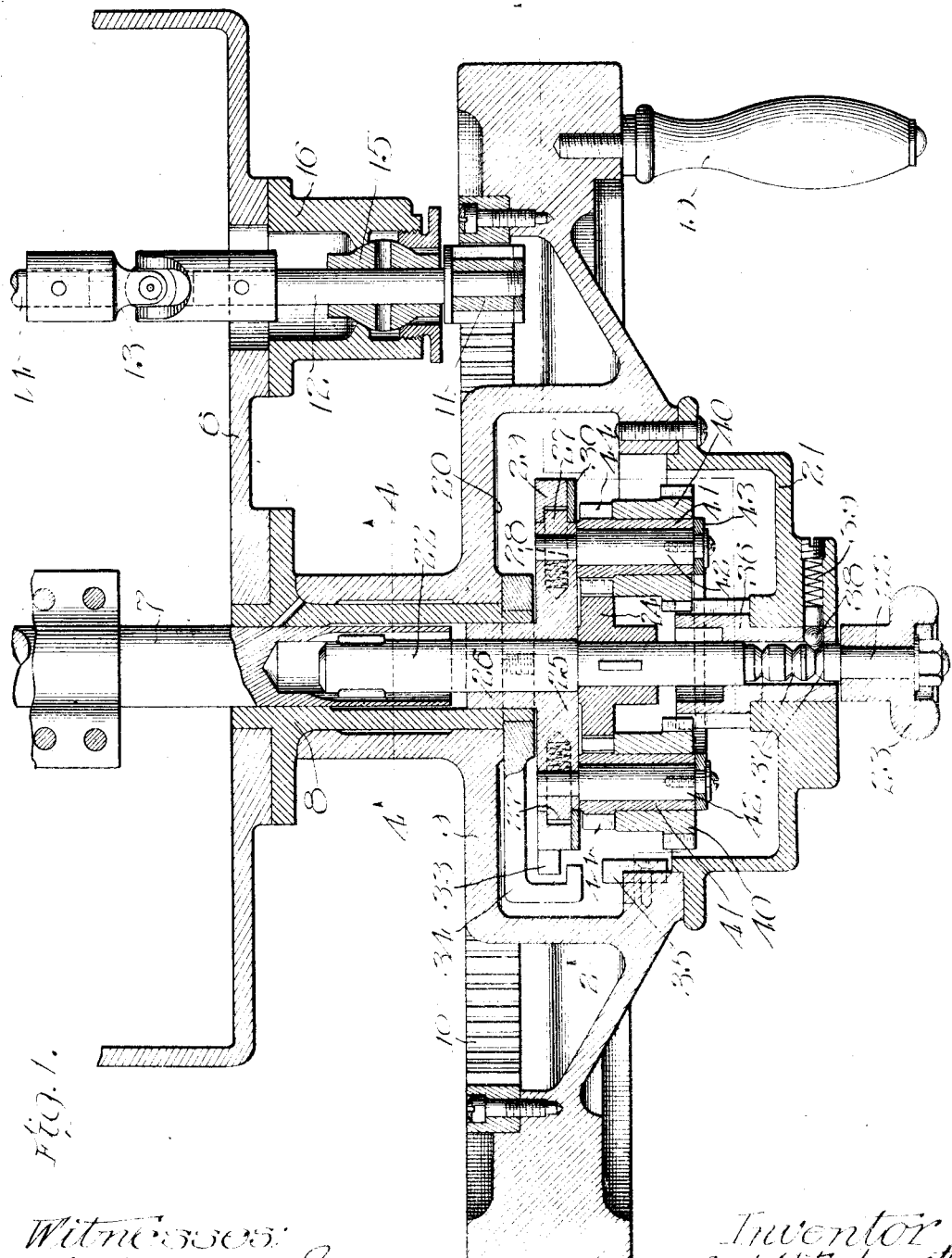

H. STUKART.
CHANGE SPEED MECHANISM.
APPLICATION FILED SEPT. 25, 1914.

1,184,044.

Patented May 23, 1916.
2 SHEETS—SHEET 1.

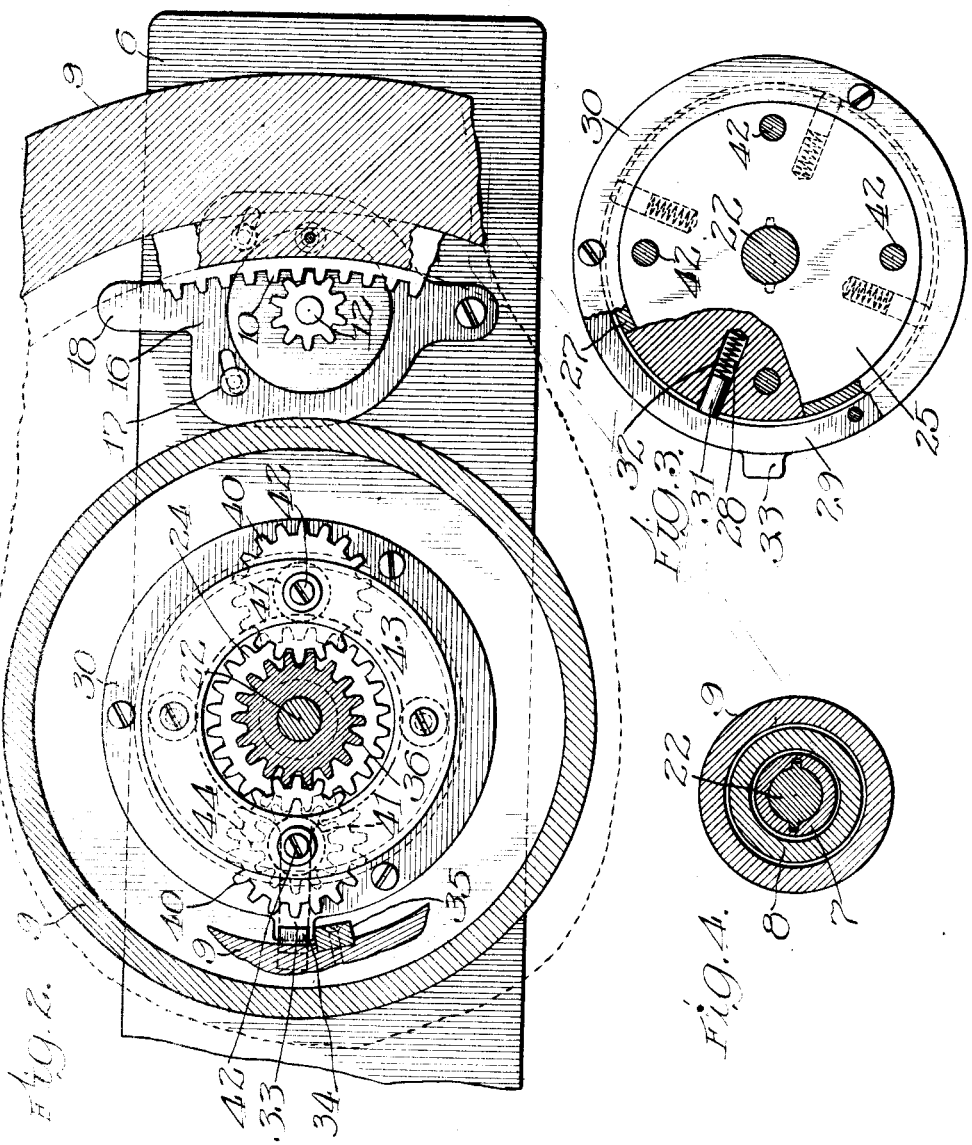

UNITED STATES PATENT OFFICE.

HENDRIK STUKART, OF CHICAGO, ILLINOIS, ASSIGNOR TO U. S. SLICING MACHINE CO., OF CHICAGO, ILLINOIS, A CORPORATION OF ILLINOIS.

CHANGE-SPEED MECHANISM.

1,184,044.    Specification of Letters Patent.    Patented May 23, 1916.

Application filed September 25, 1914. Serial No. 863,442.

*To all whom it may concern:*

Be it known that I, HENDRIK STUKART, a subject of the Queen of Holland, residing at Chicago, in the county of Cook and State of Illinois, have invented certain new and useful Improvements in Change-Speed Mechanism, of which the following is a specification.

This invention relates to improved mechanism for either idling a shaft, driving it at full speed or at an intermediate speed while the speed of the driven member remains the same.

A further object of the invention is to provide improved means for operating a change speed mechanism of this class.

For the attainment of these ends and the accomplishment of other new and useful objects, as will appear, the invention consists in the features of novelty in the construction, combination and arrangement of the several parts generally shown in the accompanying drawings and described in the specification, but more particularly pointed out in the appended claims.

In the drawings, Figure 1 is a sectional view of mechanism of this class constructed in accordance with the principles of my invention. Fig. 2 is a sectional view taken on the line 2—2 of Fig. 1. Fig. 3 is a detail view of a friction ring, and Fig. 4 is a sectional view on the line 4—4 of Fig. 1.

Although this invention may have a general application it is particularly designed and adapted for use in connection with machines having a fly wheel and driven by a motor, with a driving shaft which may be directly connected for operation with the fly wheel or operated at a less speed, or idled when desired, without altering the driving speed of the fly wheel.

In the drawings, the numeral 6 designates generally the base or frame of the machine to which this mechanism is attached, and the numeral 7 designates the driving shaft of the machine. A fixed bearing 8 is supported by the frame upon which is mounted a rotatable member or fly wheel 9. A gear 10 is formed integral or secured to the fly wheel, and meshing with the gear is a drive pinion 11 mounted upon a shaft 12 and connected by means of a universal joint 13 with a driving shaft 14 of any suitable driving motor. The shaft 12 is preferably mounted in a universal bearing 15 carried by an adjustable support 16 having a pin and slot connection 17 (see Fig. 2) with the frame 6, and having a handle 18 by means of which the support 16 may be moved so that the pinion 11 is out of mesh with the driving gear 10. If desired, a handle 19 may also be provided for operating the fly wheel.

Adjacent the hub of the fly wheel it is cored out to form a recess 20 for which a cover 21 is provided and in this covered chamber is disposed a differential gearing for connecting the fly wheel with the driving shaft 7. This differential gearing comprises a shaft 22 which is feathered to the shaft 7 and extends through the outside of the cover and on the outer end it is provided with a knob 23 for moving the shaft longitudinally with respect both to the fly wheel and to the driving shaft 7 without disconnecting it from the latter. Secured to the shaft 22 is a gear 24 and freely mounted on the shaft adjacent this gear is a plate 25 having a hub portion 26 which is freely rotatable within the bearing 8 and forms a bearing for the inner end of the shaft 22. The outer edge of the plate 25 is formed with a ridge 27 in which are radial holes 28 (see Fig. 3). Surrounding the plate 25 is a friction ring 29 held in place on the ridge 27 by means of a plate 30, and bearing against the inside of the friction ring 29 are a plurality of friction members 31 disposed in the radial holes 28 and each pressed outwardly by a spring 32. This friction ring 29 is formed with a projection 33 which is adapted to be engaged by stops, one of which is a stop 34 secured to the bearing 8 and preferably spaced from the bearings so that the projection 33 will lie within the engaging part of the stop 34, as shown in Fig. 1. Another stop 35 is secured to the fly wheel 9 on the other side of the stop 34.

Secured to the cover 21, and consequently to the fly wheel itself, is a gear 36, which, if desired, may form a bearing for the outer end of the shaft 22 and adjacent this end of the shaft it is provided with a series of grooves 37 corresponding to the different positions of the friction ring 29 so that the projection of the ring may be free from engagement or may engage either the stop 34 or the stop 35. In order to hold the shaft 22 in any one of its adjusted positions a spring-pressed detent or pawl 38 mounted in a recess 39 in the cover 21 is forced releasably into one of the grooves 37. The gear 36 secured to the cover 21 is of some width so that one or more pinions 40 may be moved longitudinally of the gear 36 without being disengaged therefrom. Each pinion 40 is mounted on a bushing 41 which is in turn supported by a pin 42 secured to the plate 25. Each pinion 40 is also provided with a toothed portion 44 which meshes with gear 24 secured to the shaft 22. The outer ends of the pins 42 are connected and supported by means of a ring 43 secured thereto. The gear 36 is also recessed to receive the hub of gear 24 so that the shaft 22 and all the gears connected and supported thereby may be freely moved longitudinally with respect to the gear 36 without disengaging the pinions 40 from the said gear, and still maintaining a compact construction which is readily contained in the chamber 20.

In the continuous operation of the fly wheel there are three possible conditions. The driving shaft 7 may be idled, it may be operated at the speed of the fly wheel, or at intermediate speed. When the shaft 22 and the friction ring 29 are in the position shown by Fig. 1 the shaft 22 will be prevented from rotating by the friction of the driving shaft 7 and the parts attached to it, and the pinions 40 will simply walk around the gear 24 fixed to the shaft 22 carrying with them the plate 25 which is freely mounted with respect to the shaft 22. If the shaft 22 is drawn out until the intermediate groove 37 is engaged by the pawl 38 the projection 33 of the friction ring 29 will engage the fixed stop 34 and the friction ring will be prevented from any rotation whatever. This will cause the pinions 40 and the toothed portions 44 to drive the shaft 22 by means of the gear 24 in the same direction as the fly wheel but at reduced speed since the toothed portions 44 are smaller than the pinions 40 and the gear 24 is somewhat larger than the gear 36. Thus the driving shaft 7 will be rotated at an intermediate speed. When the shaft 22 is moved so that the innermost notch 37 is engaged, the projection 33 will engage the stop 35 which is carried by the fly wheel and the entire differential mechanism will be moved, together with the shaft 22 and the driving shaft 7, in the same direction as the fly wheel itself.

In order to change the speed of the driving shaft 7 the shaft 22 is moved by means of the knob 23 and when the shaft is in the outermost position the knob is pushed inwardly to the intermediate or idle position.

This action is very simple and can be accomplished at any time without danger of catching anything upon the shaft or any rotating part.

It will be obvious that a frictional connection is made between the plate 25 and the friction ring 29 which particularly adapts the present mechanism for use in connection with any mechanism in which there is danger of damage by reason of the continued operation of the mechanism. For example, in a grinding or slicing machine where the grinding or cutting mechanism is absolutely stopped by some substance which it is impossible to cut. In the present construction the frictional connection between the driving shaft 7 and the fly wheel will permit the fly wheel to continue its rotation even though the driving shaft 7 is stopped, and even though the friction ring is engaged by either one of its stops.

What I claim is:

1. The combination with a driven rotatable member, of a driving shaft coaxial therewith, and differential gearing movable longitudinally with the shaft to connect the member and the shaft for driving the shaft at different speeds.

2. The combination with a driven rotatable member and a fixed support, of a driving shaft coaxial therewith, and differential mechanism having gears and means to form a frictional connection between the member, the gears, and the fixed support for driving the shaft at different speeds.

3. The combination with a rotatable member having a recess adjacent its axis, of a shaft freely mounted but coaxial with the member, and differential means disposed within the recess and coaxially and longitudinally movable for making a driving connection between the member and the shaft to drive the shaft at different speeds.

4. The combination with a driven fly wheel, of a driving shaft coaxial therewith, and coaxially and longitudinally movable differential mechanism for effecting a driving engagement between the fly wheel and the shaft for rotating the shaft at different speeds.

5. The combination with a stationary support, of a member rotatable at a constant speed, a shaft free from the member and coaxial therewith, and mechanism comprising gears directly connected with the member, and means to form a frictional connection between the member and the gears and the stationary support for driving the shaft at different speeds.

6. A fly wheel supported for free rotation about its axis, a driving shaft coaxial therewith for rotation free from the fly wheel, gears directly connected to the fly wheel, a frictional connection between the gears and the fly wheel and fly wheel support, and means to move the gears and the said frictional connection along the axis of the fly wheel to make connection with the fly wheel or its support for driving the shaft at different speeds.

7. In change speed mechanism, the combination with a member rotatable at a constant speed, of a shaft coaxial therewith and movable coaxially, and mechanism comprising means bodily movable with the shaft to form both a gear and a frictional connection between the member and the shaft for rotating the shaft at different speeds.

8. In change speed mechanism, the combination with a member rotatable at a constant speed, of a shaft free from the member but coaxial therewith and longitudinally movable, gears forming a driving connection between the member and the shaft, means connected to some of the gears for forming a frictional connection between them and the said member, and a stop engaged by the means when the shaft is moved longitudinally to effect a different driving relation between the member, the gears, and the shaft.

9. In change speed mechanism, the combination with a driven member, of a shaft free therefrom but coaxial therewith and longitudinally movable, and a differential gear connecting the member and the shaft bodily movable and operated by the coaxial movement of the shaft.

10. In change speed mechanism, the combination with a rotatable member, of a shaft coaxial therewith and movable longitudinally, a differential gear connecting the member and the shaft and operated by the longitudinal movement of the shaft, said gear comprising a frictional member, and a fixed stop to engage the frictional member in one longitudinal position of the shaft to effect one of the driving connections between the member and the shaft.

11. In change speed mechanism, the combination with a rotatable member, of a shaft coaxial therewith and movable longitudinally, a differential gear connecting the member and shaft and comprising a frictional member movable with the shaft, and a stop in connection with the member adapted to engage the frictional member when the shaft is moved longitudinally to effect one of the change speed connections between the member and the shaft.

12. In change speed mechanism, the combination with a rotatable member, of a longitudinally movable shaft, a differential gear connecting the member and the shaft and embracing a frictional member, a fixed stop to engage the frictional member, and a stop in connection with the rotatable member to engage the frictional member whereby the longitudinal movement of the shaft will move the frictional member to engage one stop or the other to effect different driving connections between the rotatable member and the shaft.

13. In change speed mechanism, the combination with a rotatable member, of a longitudinally movable shaft, a differential gear to connect the shaft with the member comprising a plate to which some of the gears are connected, a friction ring in engagement with the plate, and means to engage the friction ring upon the longitudinal movement of the shaft to effect the changes in driving connections of the differential gear.

14. The combination with a rotatable member, of a longitudinally movable shaft, a differential gear to connect the shaft with the member embodying a plate to which some of the gears are connected with radial holes in the edge, a friction ring about the edge of the plate and spring-pressed friction members in the holes to engage the friction ring, and means to engage the friction ring to effect different change speed connections of the differential gear when the shaft is moved longitudinally.

15. The combination with a rotatable member, of a longitudinally movable shaft coaxial therewith, a differential gear connecting the member and the shaft bodily movable thereby and operated for different driving connections by the longitudinal movement of the shaft, and a driving shaft having a feathered connection with the other shaft.

16. The combination with a fly wheel, of means for continuously rotating it, a driving shaft coaxial with the fly wheel, a longitudinally movable shaft feathered to the driving shaft projecting from one side of the fly wheel, a differential gear connecting the longitudinally movable shaft and the fly wheel and operated for different driving connection by the longitudinal movement of the shaft, and means for holding the longitudinally movable shaft in any one of the positions corresponding to the different driving positions of the shaft and the differential gear.

17. In change speed mechanism, the combination with a rotatable member, of a longitudinally movable shaft coaxial therewith, a plate free to move on the shaft, a gear secured to the shaft, another gear secured to the member, pinions carried by the plate meshing both with the gear on the shaft and the gear on the member, a frictional ring in connection with the plate having a projection therefrom, a non-rotatable stop to engage the projection, a stop carried by the member to engage the projection, the shaft being provided with a plurality of annular grooves corresponding to the positions in which the projection will engage either one or neither of the stops, and means in connection with the member to hold the shaft in any adjusted position.

18. A two-speed driving mechanism comprising a rotatable fly wheel, a driving shaft, a longitudinally movable shaft feathered to the other shaft coaxial with the fly wheel, a differential gear connecting the longitudinally movable shaft to the fly wheel and comprising a friction ring having a projection therefrom, a fixed stop to engage the projection, a stop carried by the fly wheel for engaging the projection, a space also being provided to permit the free rotation of the friction ring, means to hold the longitudinally movable shaft releasably in position so that the friction ring will rotate freely or engage one of the stops, and a knob at the outer end of the longitudinally movable shaft by means of which the shaft may be moved into any one of the several positions.

19. The combination with a rotatable member, of a longitudinally movable shaft, a differential gear connecting the shaft and the member operated by the longitudinal movement of the shaft and comprising a friction ring in connection therewith, a fixed stop for the friction ring, a movable stop in connection with the rotatable member, a driving shaft feathered to the other shaft and adapted to be driven at different speeds by the differential gear, and a frictional connection permitting the fly wheel to rotate when the driving shaft has been stopped even though the differential gear is set for operating the driving shaft at intermediate or full speed.

20. The combination with a rotatable member, of a longitudinally movable shaft, a driving shaft feathered to the other shaft, and a differential connection between the longitudinally movable shaft and the rotatable member comprising a frictional connection and a fixed and movable stop therefor whereby the fly wheel will continue to operate even though the driving shaft is stopped when the frictional connection is in engagement with either one of the stops.

In testimony whereof I have signed my name to this specification, in the presence of two subscribing witnesses, on this 18th day of September A. D. 1914.

HENDRIK STUKART.

Witnesses:
F. N. GOODFELLOW,
KATHRYN HONKAMP.